United States Patent
Koelemeijer

(10) Patent No.: US 11,882,863 B2
(45) Date of Patent: Jan. 30, 2024

(54) APPARATUS FOR DRYING AND/OR ROASTING BEANS OR NIBS

(71) Applicant: Royal Duyvis Wiener B.V., Koog Aan de Zaan (NL)

(72) Inventor: Reiner Ernst Koelemeijer, Krommenie (NL)

(73) Assignee: ROYAL DUYVIS WIENER B.V., Koog Aan de Zaan (NL)

( * ) Notice: Subject to any disclaimer, the term of this patent is extended or adjusted under 35 U.S.C. 154(b) by 502 days.

(21) Appl. No.: 17/077,852

(22) Filed: Oct. 22, 2020

(65) Prior Publication Data

US 2021/0037876 A1 Feb. 11, 2021

Related U.S. Application Data

(63) Continuation of application No. 14/442,274, filed as application No. PCT/EP2013/073884 on Nov. 14, 2013, now abandoned.

(30) Foreign Application Priority Data

Nov. 14, 2012 (EP) ..................................... 12192655

(51) Int. Cl.
*A23N 12/10* (2006.01)
(52) U.S. Cl.
CPC .................................... *A23N 12/10* (2013.01)
(58) Field of Classification Search
CPC .......... A23N 12/10; A23G 1/002; F26B 3/24; F26B 11/02; F26B 11/0445
USPC ........................................................ 99/483
See application file for complete search history.

(56) References Cited

U.S. PATENT DOCUMENTS

| 255,965 A | 4/1882 | Fleury et al. |
| 1,547,655 A | 7/1925 | Johnston |
| 1,566,430 A | 12/1925 | Walter |
| 1,603,189 A | 10/1926 | Bruning |
| 2,129,673 A * | 9/1938 | Burns ........................ A23F 5/04 |
| | | 34/79 |
| 2,160,948 A | 6/1939 | Wiley et al. |
| 2,279,362 A | 4/1942 | Baker |

(Continued)

FOREIGN PATENT DOCUMENTS

| CN | 202043603 U | 11/2011 |
| DE | 2116807 A1 | 11/1971 |

(Continued)

OTHER PUBLICATIONS

Probat Burns, Aug. 28, 2008, Centrifugal Commercial Coffee Roasters (Year: 2008).*

(Continued)

*Primary Examiner* — Nathaniel E Wiehe
*Assistant Examiner* — Spencer H. Kirkwood
(74) *Attorney, Agent, or Firm* — Steven M. Koehler; Westman, Champlin & Koehler, P.A.

(57) ABSTRACT

An apparatus for drying and/or roasting beans, such as cocoa beans, or parts of beans, such as nibs, includes a frame, a drum for receiving the (parts of) beans, rotatably mounted in the frame and provided with an inlet for a fluid, in particular a gas, such as heated air, a fan for feeding the fluid via the inlet to the drum, and a drive for rotating the drum. The fluid inlet and the drive are located on the same end of the drum.

22 Claims, 1 Drawing Sheet

(56) References Cited

U.S. PATENT DOCUMENTS

| | | | |
|---|---|---|---|
| 2,360,838 A | 10/1944 | Atti | |
| 2,433,781 A | 12/1947 | McFeaters | |
| 3,109,718 A | 11/1963 | Falla | |
| 4,559,720 A | 12/1985 | Marquardt | |
| 4,802,140 A | 1/1989 | Dowling | |
| 4,860,461 A | 8/1989 | Tamaki | |
| 5,182,981 A * | 2/1993 | Wilcox | A47J 37/047 34/139 |
| 5,193,444 A * | 3/1993 | Bar-Sheshet | A21B 1/26 99/450 |
| 5,638,607 A | 6/1997 | Lemme et al. | |

FOREIGN PATENT DOCUMENTS

| | | | | |
|---|---|---|---|---|
| DE | 202008911577 U1 | | 10/2008 | |
| DE | 202008011577 U1 * | | 12/2008 | A23N 12/10 |
| EP | 0328791 A2 | | 8/1989 | |
| EP | 2160948 A1 | | 3/2010 | |
| EP | 2919596 A | | 9/2015 | |
| GB | 139503 A | | 1/1921 | |
| WO | 199212643 A1 | | 8/1992 | |
| WO | WO-9212643 A1 * | | 8/1992 | A23F 5/04 |
| WO | 1993012643 A1 | | 7/1993 | |
| WO | WO-0040103 A2 * | | 7/2000 | A23N 12/10 |
| WO | 2009127728 A2 | | 10/2009 | |

OTHER PUBLICATIONS

ARIPO Office Action, dated Dec. 20, 2018 for corresponding ARIPO patent application No. AP/P/2015/008474, filed Nov. 14, 2013.

Written Decision from Opposition Division for European Patent Application No. 13789592.6, dated Feb. 18, 2019.

Indonesian Office Action for Indonesian Patent Application No. P00201503513, dated Mar. 28, 2019.

Brazilian Office Action for Brazilian Patent Application No. 112015010705-2, filed Nov. 14, 2013.

Chinese Office Action, dated Jul. 26, 2018 for corresponding Chinese Patent Application No. 201380065432.4, filed Nov. 14, 2013.

English Translation of European Notice of Opposition, dated Jun. 21, 2017 for corresponding European Patent Application No. 2919596, filed Nov. 14, 2013.

English Translation of European Notice of Opposition, dated Jun. 26, 2017 for corresponding European Patent Application No. 2919596, filed Nov. 14, 2013.

European Reply of the patent proprietor to the notice(s) of opposition, dated Dec. 18, 2017 for corresponding European Patent Application No. 2919596, filed Nov. 14, 2013.

European Search Report and Written Opinion for European patent application No. 16190926, dated Jan. 19, 2017.

Brazilian Office Action for Brazilian Patent Application No. BR112015010705-2, dated Jun. 12, 2019, with English translation.

Indian Examination Report for Indian Patent Application No. 3013/CHENP/2015, dated Sep. 9, 2019.

Statement of Grounds of Appeal in Opposition in European Patent Application No. 13789592.6.

International Preliminary Report on Patentability, dated Mar. 11, 2015, for corresponding International Application No. PCT/EP2013/073884, filed on Nov. 14, 2013 and an International Search Report for corresponding International Application No. PCT/EP2013/073884, dated Feb. 11, 2014.

European Communication from the European Patent Office for European Patent Application No. 16190926.2, filed Nov. 14, 2013, dated May 25, 2020.

Probat Burns, Aug. 28, 2008, Centrifugal Commercial Coffee Roasters.

Office Action from the Chinese Patent Application for patent application No. 201380065432.4, dated Dec. 7, 2020, with English translation.

\* cited by examiner

APPARATUS FOR DRYING AND/OR ROASTING BEANS OR NIBS

CROSS-REFERENCE TO RELATED APPLICATION

The present application is a continuation of U.S. Ser. No. 14/442,274, filed May 12, 2015, which is a national stage filing of International patent application Serial No. PCT/EP2013/073884, filed Nov. 14, 2013, and published as WO 2014/076211 A1 in English.

BACKGROUND

The discussion below is merely provided for general background information and is not intended to be used as an aid in determining the scope of the claimed subject matter.

Aspects of the invention relate to an apparatus for drying and/or roasting beans, such as cocoa beans, or parts of beans, such as nibs, comprising a frame, a drum for receiving the (parts of) beans, rotatably mounted in the frame and provided with an inlet for a fluid, in particular a gas, such as heated air, a fan for feeding the fluid via the inlet to the drum, and a driving means for rotating the drum. Typically, the apparatus further comprises a burner or the like for heating the exterior wall of the drum.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background. An aspect of the present invention to provide an improved industrial drum roaster.

To this end, the fluid inlet and the drive are located on the same end of the drum. In an embodiment, the inlet is coaxial with the axis of rotation of the drum. In another embodiment the inlet extends thorough a part of the drive, e.g. through a driven pulley or gear of the drive.

Thus, construction and/or operation of the apparatus is simplified, more robust and better suited for use on an industrial scale.

In an embodiment, the apparatus comprises a door located on the end of the drum opposite the fluid inlet and the drive.

In a further embodiment, the apparatus comprises an outlet and/or inlet for the (parts of) beans, which outlet and/or inlet is located on the end of the drum opposite the fluid inlet and the drive, preferably in the door.

In another embodiment, an outlet for the fluid, in addition to the outlet for the (parts of) beans, is located on the end of the drum opposite the fluid inlet and the drive, i.e. the opposite end of the drum comprises both an outlet for discharging nibs or beans from the drum and an exhaust for the fluid.

To prevent clogging, in an embodiment, the inlet for the fluid comprises a tube for containing the fluid and a device, preferably a conveying screw positioned inside the tube, for returning materials originating from the drum to the drum.

In another embodiment, the apparatus comprises a heater and a controller for heating the fluid, prior to it being fed to the drum, to a temperature in a range from 110 to 200° C.

Within the framework of the present invention the adjective "industrial" is defined as having a capacity of at least 2000 kg of (parts of) beans per batch.

In an embodiment, the outlet of the drum roaster comprises a mechanism for moving the door rearwards in axial direction over a limited distance, e.g. a distance in a range from 2 to 15 centimeters, thus providing, e.g. after roasting, sufficient clearance for the nibs to exit the drum, e.g. via a chute. In a refinement, the clearance is at least substantially annular.

BRIEF DESCRIPTION OF THE DRAWINGS

The invention will now be explained in more detail with reference to the FIGURE, which schematically shows an example of a drum roaster.

FIG. 2 is a schematic view of a screw inside an inlet tube.

DETAILED DESCRIPTION OF THE ILLUSTRATIVE EMBODIMENTS

Figure 1:
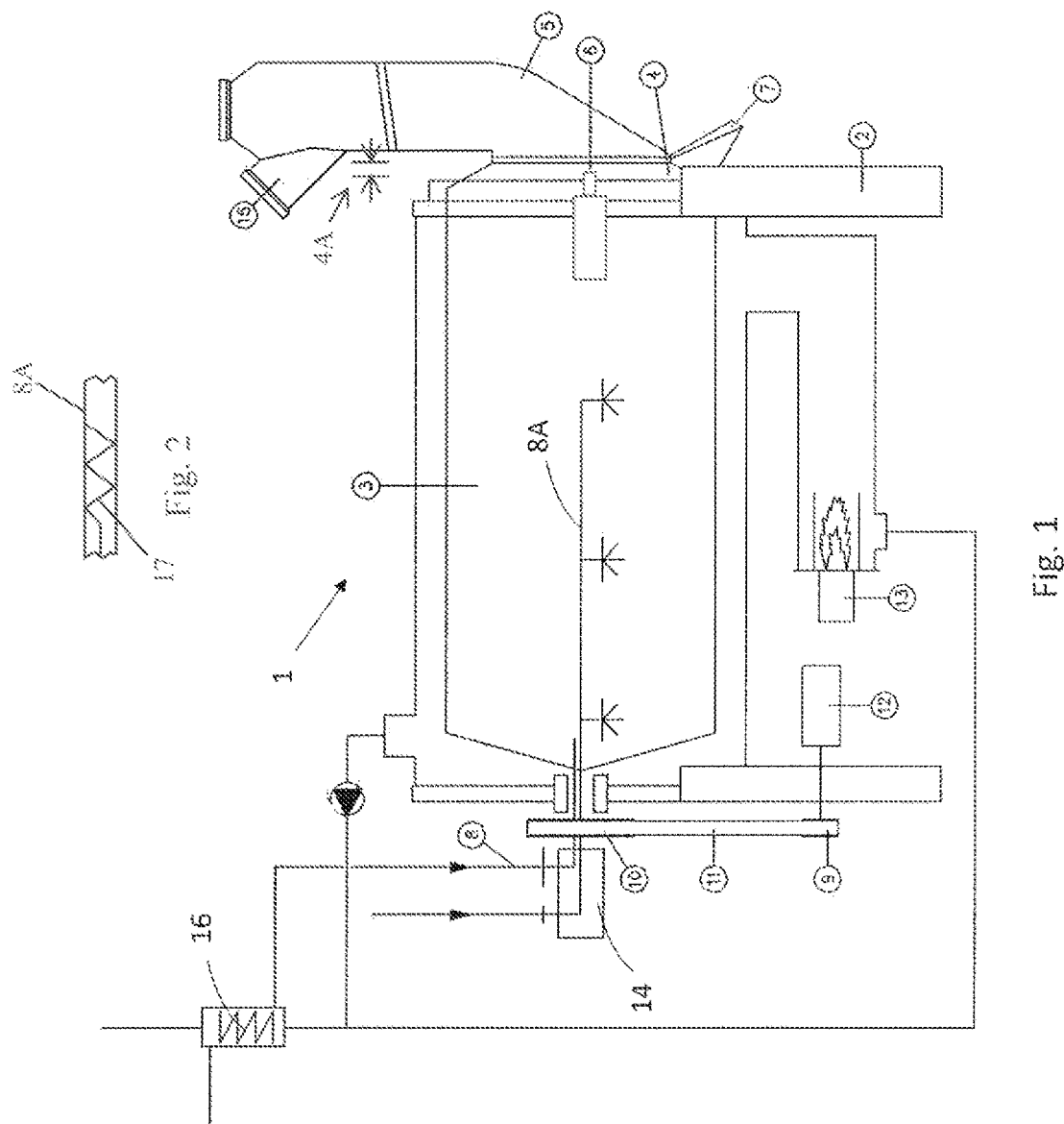
FIG. 1 is a cross-sectional side view of a drum roaster.

FIG. 1 is a cross-sectional side view of a drum roaster 1 for drying and/or roasting cacao nibs. The drum roaster 1 comprises a frame 2 and a drum 3 for receiving up to 5 tons of nibs, rotatably mounted in the frame 2, e.g. resting on bearings. On one side the drum 3 comprises a door 4 and an inlet 5 for the nibs. The drum roaster 1 comprises a mechanism 6, e.g. comprising pneumatic or hydraulic cylinders, for moving the door rearwards, i.e. away from the drum, in axial direction and over a limited distance 4A, thus providing, after roasting, an annular clearance sufficient for the nibs to exit the drum 3, e.g. via a chute 7 and preferably without fully opening the door 4.

The other end of the drum 3 is provided with an inlet 8 for air and a belt drive, comprising a plurality of pulleys 9, 10, a belt 11, and a motor 12, for rotating the drum 3. The inlet 8 is coaxial with the axis of rotation of the drum 3 and extends through the driven pulley 10 fixed to the drum 3. In this example, the inlet 8 comprises a tube 8A extending through the greater part of the drum 3. To prevent clogging, in an embodiment illustrated in FIG. 2, the inlet 8 for the fluid comprises the tube for containing the fluid and a device, preferably a conveying screw 17 positioned inside the tube 8A, for returning materials originating from the drum 3 to the drum 3. A burner 13 is mounted near, e.g. below the drum 3, for heating the exterior wall of the drum 3 with flue gas.

A fan 14 is provided for feeding the gas from the surroundings via a heat exchanger 16 and the inlet 8 to the drum 3. The flue gas may be exhausted via the heat exchanger 16, such that heat may be exchanged between the exhausted flue gas and air to be fed to the drum 3. The circuits for flue gas from the burner 13 and air to be fed to the drum 3 are completely separated.

In addition to the inlet 8 for the (parts of) beans, the door 4 comprises a fluid outlet 15 for exhausting gas from the drum 3. In FIG. 1, the fluid outlet is indicated as part 15 being connected to the inlet 5 for the nibs. Part 15 is connected to the fluid outlet comprised by the door 4 of the drum 3, such that exhausting gas from the drum 3 may leave the drum 3 via the fluid outlet 15.

The invention is not restricted to the above-described embodiments, which can be varied in a number of ways within the scope of the claims.

What is claimed is:

1. An apparatus for drying and/or roasting items, comprising a frame, a drum configured to receive the items, rotatably mounted in the frame and provided with an inlet for a fluid, a fan for feeding the fluid via the inlet to the drum, a drive configured to rotate the drum, and a burner configured to heat an exterior wall of the drum, wherein the burner is disposed outside of the drum to heat gas outside the drum that impinges upon the exterior wall of the drum, wherein the fluid inlet and the drive are located on one end of the drum, wherein the inlet is coaxial with the axis of rotation of the drum and wherein a door is located on the drum opposite the fluid inlet and the drive, and wherein the inlet for the fluid comprises a tube configured to contain the fluid and a device configured to return materials originating from the drum to the drum.

2. The apparatus according to claim 1, wherein the inlet extends through a part of the drive.

3. The apparatus according to claim 1, comprising an outlet and/or inlet for the items, which outlet and/or inlet is located on the end of the drum opposite the fluid inlet and the drive.

4. The apparatus according to claim 3, comprising an outlet for the fluid, in addition to the outlet for the items, located on the end of the drum opposite the fluid inlet and the drive.

5. The apparatus of claim 3 wherein the outlet and/or inlet for the items are located in the door.

6. The apparatus according to claim 1, comprising a heater and a controller configured to heat the fluid to a temperature in a range from 110 to 200° C.

7. The apparatus according to claim 1, wherein the drum has a capacity of at least 2000 kg.

8. The apparatus of claim 7 wherein the drum has a capacity of at least 3000 kg.

9. The apparatus according to claim 1 comprising a mechanism configured to move the door rearwards in an axial direction to provide sufficient clearance for the items to exit the drum.

10. The apparatus according to claim 9, wherein the door is movable over a distance in a range from 2 to 15 centimeters.

11. The apparatus according to claim 9, wherein a clearance of the door from the drum is at least substantially annular.

12. The apparatus according to claim 1 comprising an actuator coupled to the door and configured to move the door rearwards in an axial direction.

13. The apparatus according to claim 12, wherein the door is movable over a distance in a range from 2 to 15 centimeters.

14. The apparatus according to claim 12, wherein a clearance of the door from the drum is at least substantially annular.

15. An apparatus for drying and/or roasting items, comprising a frame, a drum configured to receive the items, rotatably mounted in the frame and provided with an inlet for a fluid, a fan for feeding the fluid via the inlet to the drum, a drive configured to rotate the drum, and a burner configured to heat an exterior wall of the drum, wherein the burner is disposed outside of the drum to heat gas outside the drum that impinges upon the exterior wall of the drum, wherein the fluid inlet and the drive are located on one end of the drum, wherein the inlet is coaxial with the axis of rotation of the drum and wherein a door is located on the drum opposite the fluid inlet and the drive, and wherein the inlet for the fluid comprises a tube configured to contain the fluid and a screw disposed in the tube.

16. The apparatus according to claim 15, wherein the inlet extends through a part of the drive.

17. The apparatus according to claim 15, comprising an outlet and/or inlet for the items, which outlet and/or inlet is located on the end of the drum opposite the fluid inlet and the drive.

18. The apparatus according to claim 17, comprising an outlet for the fluid, in addition to the outlet for the items, located on the end of the drum opposite the fluid inlet and the drive.

19. The apparatus according to claim 15, comprising a heater and a controller configured to heat the fluid to a temperature in a range from 110 to 200° C.

20. The apparatus according to claim 15, wherein the drum has a capacity of at least 2000 kg.

21. The apparatus of claim 17 wherein the outlet and/or inlet for the items are located in the door.

22. The apparatus of claim 15 wherein the drum has a capacity of at least 3000 kg.

* * * * *